United States Patent [19]

Elstow et al.

[11] 3,961,259

[45] June 1, 1976

[54] MARINE SMOKE MARKERS

[75] Inventors: William Rupert Brooke Elstow; David Michael Jennings, both of Salisbury, England

[73] Assignee: Pains-Wessex Limited, Salisbury, England

[22] Filed: July 5, 1974

[21] Appl. No.: 486,209

[30] Foreign Application Priority Data

July 5, 1973 United Kingdom ............. 31994/73

[52] U.S. Cl. .................................. 325/66; 9/8.3 R; 325/116

[51] Int. Cl.[2] .................... B63B 21/52; H04B 1/034

[58] Field of Search ............. 9/8.3 R, 8.3 E, 9, 313; 325/116, 311, 102, 314, 66; 340/2; 343/709; 116/114 F

[56] References Cited

UNITED STATES PATENTS

| | | | |
|---|---|---|---|
| 3,329,981 | 7/1967 | Orsino | 9/8.3 E |
| 3,581,693 | 6/1971 | Basset | 9/9 |

*Primary Examiner*—George H. Libman
*Attorney, Agent, or Firm*—Hall & Houghton

[57] ABSTRACT

In a buoyant smoke marker for marine use, the provision of a radio transmitter. The marker can be located from much greater distances than can conventional smoke markers.

20 Claims, 10 Drawing Figures

MARINE SMOKE MARKERS

This invention relates to smoke markers.

It has previously been proposed to use buoyant smoke markers as marine markers for distress purposes. Such devices are described, for example, in United Kingdom patent specification Nos. 929,309 and 1,277,573.

The invention provides a smoke marker suitable for marine use comprising a casing, a mass of smoke-generating composition contained in the casing, and means for igniting the smoke-generating composition, the marker being buoyant, which which includes a radio transmitter and an aerial and a power source for the transmitter.

The marker can be thrown into the sea as a personnel marine marker. In operation, the marker can be detected and located, with suitable direction-sensitive radio receiving equipment (for example, on a ship), from a much greater distance than could a conventional smoke-generating marine marker, especially in bad visibility; while at close range the marker can be accurately located from a ship or by a person floating in the sea as well as with a conventional smoke marker by visual observation of the smoke. The fact that the marker can be detected from much larger distances than prior smoke markers makes the marker particularly useful as a distress signal on large modern tankers, which have very large turning circles. For example, if a person fell overboard and his position were marked with a conventional smoke marker, sight of the marker might well be lost as the ship was turning to recover him, whereas a continuous indication of the marker's location could be kept with a marker according to the invention.

Advantageously, the power source is a water-activated cell. Preferably, the water-activated cell is housed in a water-tight container having a removable closure, and there is provided connecting means, one end of which is secured to the closure and the other end of which is adapted to be connected to a mounting for the marker. For example, the casing that houses the smoke-generating composition may be provided with closure means which can be secured to a mounting and which is arranged to be removed or ruptured to provide a smoke outlet on removing the marker for the mounting, at least a part of the closure means remaining secured to the mounting. The said other end of the connecting means could be secured to the part of the closure means arranged to remain secured to the mounting; thus the closure of the container of the water-activated cell would be removed when the marker was thrown overboard. The marker may include a socket for an electric lamp and a water-activated cell therefor. This cell may also be housed in a water-tight container having a removable closure for the container, and there may be provided connecting means similar to that for the transmitter cell secured to the closure and adapted to be connected to a mounting for the marker. Each cell may be houses in a water-tight container and the arrangement may be such that activation of one of the cells causes an opening to be formed in the other container; for example, the combustion of a pyrotechnic charge ignited electrically on activation of one of the cells could be used to rupture the container for the other cell. The power source may be a thermal cell arranged to derive heat energy from the burning smoke composition, and may be supplemented by a solar cell.

Advantageously, the marker is provided with a buoyancy float outside the casing and the transmitter is housed in the buoyancy float. The float may surround the casing and be provided at diametrically opposed positions with pockets, one for the radio transmitter and the other for its power source. The float may be foam filled and plastic covered.

Advantageously, the casing of the smoke marker has an outlet of reduced cross-sectional area at one end, there is provided closure means for the outlet and smoke baffle means in the end portion of the casing that is adjacent to the outlet, the igniting means is contained within the casing, and there is provided connecting means secured to the igniting means and to the closure means, and valve means arranged to permit the withdrawal of the connecting means through the outlet but restrict the ingress of water through the outlet after the withdrawal of the connecting means, the connecting means arranged to undergo release or rupture when the tension in the connecting means reaches a certain value, the igniting means being arranged to operate when the tension in the connecting means reaches a value that does not exceed the value at which the connecting means undergoes release or rupture, and the closure means being capable of being secured to a fixed object, the arrangement being such that, in operation, on movement of the marker relative to the fixed object, the closure means is removed or ruptured and the said outlet exposed and, on movement of the marker away from the fixed object, the tension in the connecting means rises to the value at which the igniting means operates and to the value at which the connecting means undergoes release or rupture to permit the removal of the marker from the fixed object. The fixed object may be a part of a vessel or an aircraft and the marker can be brought into operation merely by moving it away from the object in some suitable manner. In the case of a marker mounted on a vessel, the marker can then be thrown overboard. The facts that the casing has an outlet of reduced cross-sectional area, that value means is provided, and that ignition is initiated before the marker reaches the water tend to prevent extinction of the combustion by the water. The casing is preferably of metal. A similar arrangement is described and claimed in United Kingdom patent specification No. 1,277,573, and the marker according to the present invention may embody any of the forms of the invention described or claimed in that Patent Specification. Thus, advantageously, the valve means comprises a membrane of waterproof material which covers substantially the whole of the cross-sectional area of the outlet and which has a slit or aperture formed therein. After the connecting means has been withdrawn, the membrane tends to return to its unstressed shape so that the openings formed by the slits or apertures tend to close. The membrane may be formed of a plastics material and may have a plurality of slits intersecting at the same point. Advantageously, the casing has a neck portion which defines the said outlet. The closure means may have a lateral extension for securing to a fixed object to mount the marker and may have a circumferentially-extending line of weakness to enable the closure means to be ruptured to expose the outlet. The provision of such a rupturable closure means enables the casing to be used more than once. The closure means may be screw-threaded and the casing screw-threaded for engagement therewith. Advantageously, the casing is elongate and comprises two generally tubular members which are each open at one end and closed at the other end and the open ends of which are in screw-threaded engagement with each other, and the igniting means and smoke-generating composition are contained within a further tube of thermally insulating material which is in sliding fit within the tubular members. Preferably, the tubular members are formed of aluminum, and the said further tube is preferably formed of synthetic resin-bonded paper. A float may be provided which is located against movement along the length of the casing by means of the flared open end of one of the tubular members and an annular rib formed on the other tubular member. The igniting means may comprise a spring-loaded member and a percussion cap, the arrangement being such that tension in the connecting means tends to compress the spring and such that, when the connecting means undergoes release or rupture, the spring-loaded member moves under the action of the spring to strike the percussion cap. Alternatively, the igniting means may comprise a friction igniter, in which a wire covered with a layer of pyrotechnic composition is drawn through a sensitive mixture to cause ignition. Preferably, the smoke-generating composition has an axially-extending passageway within which a perforated flash tube is located. The marker may include a float surrounding, but spaced apart from, the surface of the casing. The baffle means may include a baffle plate on which the igniting means is supported. The smoke marker may include a float which has a socket for a bulb and which houses a water-activated cell contained in a water-tight container, the container including a plug which is arranged to be removed when the marker is moved to tension the connecting means. The marker can conveniently be coupled to a life-belt and set in operation on release of the life belt.

Instead, the marker may embody any of the forms of marker described and claimed in United Kingdom patent specification No. 929,309.

Advantageously, the transmitter is arranged to transmit a signal in the form of periodic bursts, each burst being sufficiently long to enable a direction-sensitive receiver to be used to locate the transmitter. This has the important advantage that power is conserved and therefore that the transmitter can operate for a longer period than if it was operating continuously, without impairing attempts at locating the transmitter. Thus, the bursts may be of equal duration and lying with the range of from 2 to 20 seconds, preferably 2 to 10 seconds. The periods between successive bursts may lie within the range of from one to four times the duration of the bursts, preferably 1½ to 3 times the duration of the bursts.

The transmitter may be arranged to produce a frequency modulating signal but is preferably arranged to produce an amplitude modulated signal. Advantageously, the transmitter is arranged to operate in the V.H.F. region. This has the advantage that the aerial can be reasonably short. The transmitter preferably includes a quartz crystal oscillator from which the carrier wave is derived.

Advantageously, the transmitter includes a modulator for producing audio modulation of the carrier wave. If the marker is thrown overboard from a ship, and the ship has a receiver capable of reproducing an audio tone corresponding to the modulation, this arrangement enables the transmitter in the sea to be immediately recognised by the tone and thus distinguished from other transmitters which may be in the same area.

The audio modulation may be at a varying frequency or at a constant frequency. Thus, the audio modulator may be arranged to produce a swept tone audio modulation (a repeated signal starting at a certain note and falling) or the audio modulator may be arranged to produce an audio signal which has a rectangular waveform and which is used to switch a radio frequency amplifier stage on and off in accordance with the waveform. The audio modulator may include a pair of NOR gates arranged to produce a rectangular wave of audio frequency and controlled by a further pair of NOR gates in such a way that the audio signal only appears in periodic bursts. The amplifier stage which is switched on and off may also act as a frequency doubler for the carrier wave. NAND gates could be used instead of NOR gates.

The transmitter preferably also includes a tuned amplifier and a tuned power amplifier.

Advantageously, the transmitter is in the form of a thick film circuit encapsulated in synthetic resin to render in water-tight, a thick film circuit being one in which the components are applied to, or formed on, an insulating substrate, the components being in the form of a thick film.

The aerial should produce a substantially uniform radiation pattern of azimuth in operation to facilitate detection.

Advantageously, the aerial is of such thickness and of such material that it maintains its configuration in use without the need for separate supports. Such supports would tend to increase the wind resistance of the aerial, for example, an aerial needing an inflatable bag to maintain it erected might well be blown over in windy conditions. The aerial may be coated or covered for protection purposes; for example, the aerial may be dipped into a synthetic resin, or anodised, or covered by P.T.F.E. (teflon) or by another suitable plastics material.

The aerial may be a dipole aerial so arranged that it is vertical when the marker is floating. Preferably, the aerial is arranged to extend or erect when the device is removed from its mounting. Thus, the casing that houses the smoke-generating composition may be provided with closure means which can be secured to a mounting and which is arranged to be removed or ruptured to provide a smoke outlet on removing the marker from the mounting, at least a part of the closure means being arranged to remain secured to the mounting. The aerial may be releasably connected to the part of the closure means arranged to remain secured to the mounting in such a way that the aerial is caused or allowed to extend or erect when the marker is thrown overboard. The length of the aerial may be approximately equal to the wavelength or half the wavelength of the carrier wave, but preferably is approximately equal to one quarter of the carrier wave wavelength.

The dipole aerial may be of helical form, and may be covered by a protective material, which may be of plastics, for example, neoprene; such an aerial may be in a fixed position relative to the marker or may be contained in a storage tube and be spring-biased therein so that, on release, it is raised. (The release may be achieved by having a release member secured to a removable or rupturable closure means for the casing housing the smoke-generating composition of the kind referred to hereinbefore.) The latter arrangement can be used to reduce the affect on the radiation pattern by the casing of the marker, if this is metal. Instead, the aerial may include a strip of resilient steel curved in a transverse direction to give the strip longitudinal stability. The strip may be constrained in one or more loops but arranged for release when the device is removed from its mounting. Thus, the aerial may extend in one direction from the float at one end, be bent back upon itself between its ends, and be releasably secured to the casing housing smoke-generating composition at its other end, for example, by means of a rupturable strap. Instead, the aerial may be wound in a coil; a releasable retaining pin may be used to secure it in the coil. The releasing of the constrained aerial (to allow it to spring straight) may be accomplished, when the casing that houses the smoke-generating composition has a removable or rupturable closure of the kind referred to by connecting the rupturable strap, or the retaining pin, to the closure means. Preferably, the aerial includes a pair of strips of resilient steel which are curved in transverse direction, the curvatures being opposed. Preferably, the concave sides of the strips face each other. Additional strips of resilient steel curves in a transverse direction extending from the base of the aerial but of shorter length than the first-mentioned strip may be provided to give the aerial greater stability in use. Means may be provided for preventing the strips from moving apart while allowing relative longitudinal movement therebetween. The strips may be teflon coated to facilitate such relative longitudinal movement.

The aerial may be a loop aerial arranged to be in a substantially horizontal plane when the marker is floating. The circumference of the loop may approximately equal to the wavelength, or half the wavelength, of the carrier wave but is preferably equal to one quarter of the wavelength of the carrier wave. The loop may be discontinuous, but is preferably continuous. The loop is preferably circular. The loop is preferably arranged co-axially with the casing (to reduce the affect thereof on the radiation pattern), and preferably, there is provided a screen of conducting material beneath the loop and arranged to be in a substantially horizontal plane when the marker is floating. The separate screen is provided as ground plane, rather than using the sea for this purpose, because the distance between the screen and loop aerial is critical. The screen could be of conducting foil or mesh and must have an earth connection to the water.

The marker may include a further radio transmitter coupled to an aerial and arranged to transmit on a radar frequency. The transmitter will then appear on the radar screen of a ship provided with suitable equipment. The trace on the radar screen corresponding to the transmitter will not be continuous if the transmitter does not transmit continuously.

The invention also provides a smoke marker according to the invention described hereinbefore, in combination with a directionally sensitive receiver therefor. The receiver may have a local oscillator and be a homodyne receiver; it would, however, be necessary to provide a lock and a 90° phase shift for the local oscillator, because the output would be zero if the carrier wave oscillations and the locally generated ones were in phase. Preferably, the receiver has a local oscillator and is a heterodyne receiver, thus avoiding the need to provide such a lock and a 90° phase shift. The beat frequency may be up to 3 Megahertz. Preferably the beat frequency (the difference in frequency between the carrier wave and the locally-generated oscillations) is in the audible band; this avoids the need for an additional detector. The oscillator is advantageously a quartz crystal oscillator. The receiver preferably includes a balanced mixer comprising a diode network for synchronously detecting the signal from the receiver aerial. The receiver preferably employs an audio filter for passing only audio frequencies.

The receiver may employ a loop aerial arranged to provide a sharp null in its radiation pattern and the sensing is arranged to be carried out on the null. A null will tend to be sharper than a peak in the radiation pattern.

Smoke markers that incorporate transmitters and that are constructed in accordance with the invention, and a radio receiver for use therewith, will now be described, by way of example, with reference to the accompanying drawings, in which.

In the drawings, like parts are given like reference numeral throughout all the Figures.

The markers are basically similar to that described with reference to the drawings in United Kingdom patent specification No. 1,277,573.

Figure 1:
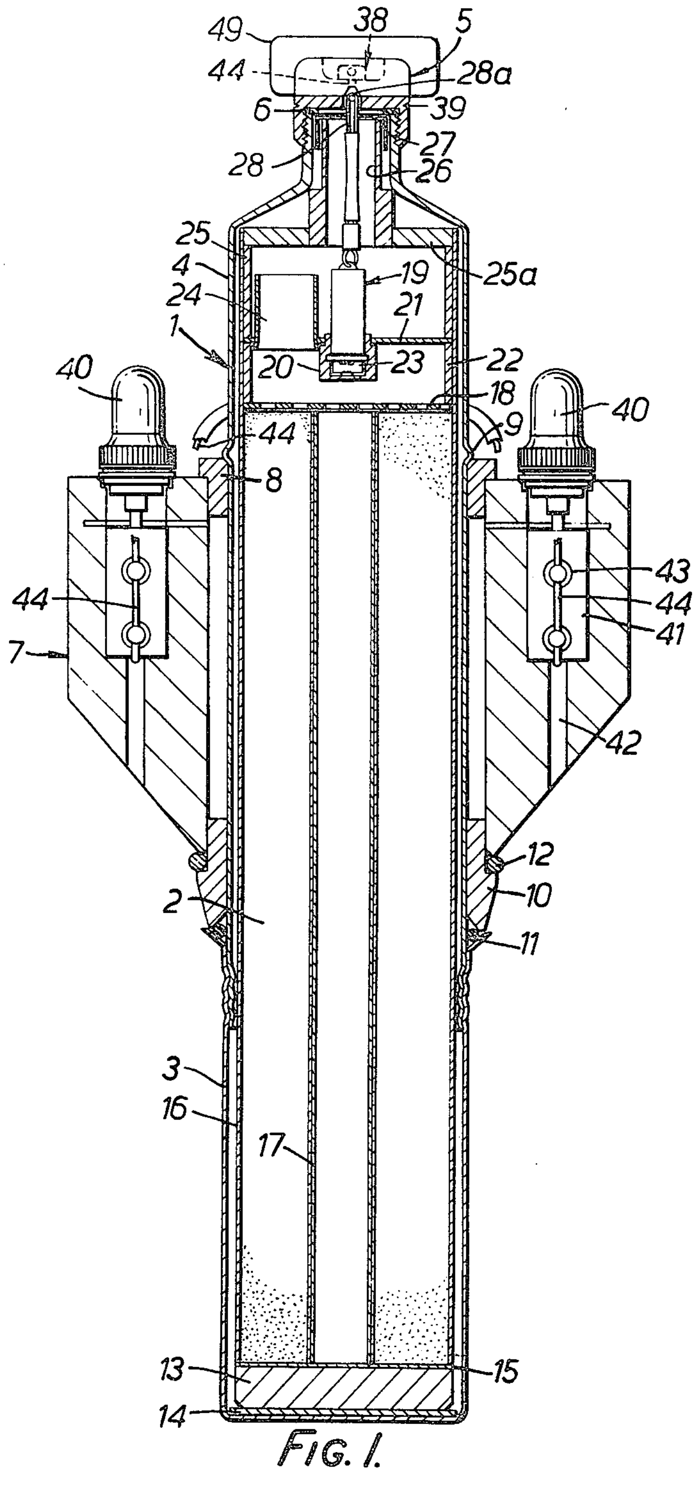
FIG. 1 is an axial section of a first marker.
Figure 2:
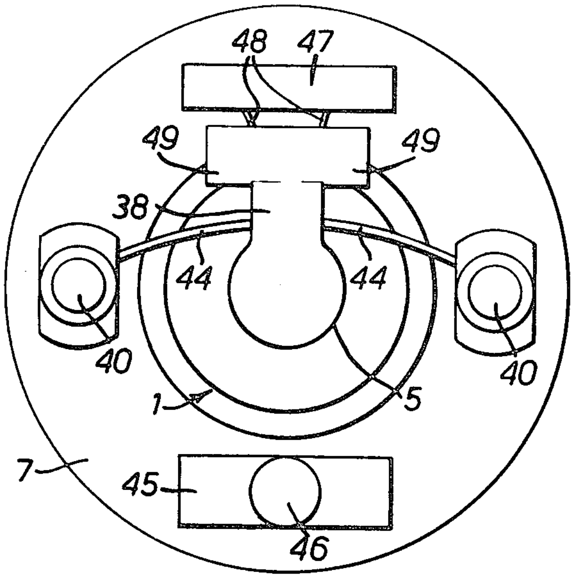
FIG. 2 is a plan view of the marker.
Figure 3:
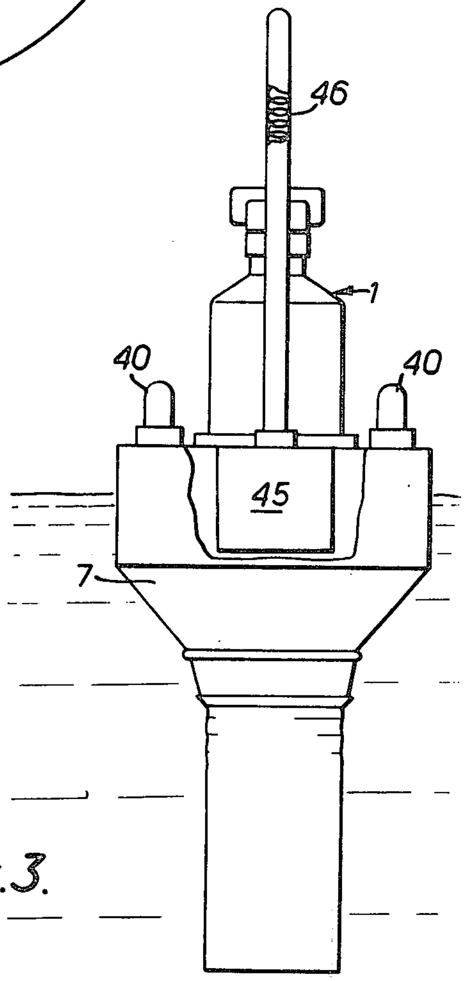
FIG. 3 is a front view of the marker (partly in section) in use.

The marker shown in FIGS. 1 to 3 comprises a casing indicated generally by the reference numeral 1, a mass of smoke-generating composition 2 contained therein, a radio transmitter 45 recessed into a buoyancy float 7, and an aerial 46 connected to the transmitter 45. The transmitter 45 is also connected to a water-activated cell housed in a water-tight container 47.

The radio transmitter is arranged to transmit in the V.H.F. region, for example, 121.65 MHz. A further radio transmitter arranged to transmit on a radar frequency, for example 913 MH may be provided if desired. (As an alternative, the first-mentioned transmitter may be arranged to operate on 2.182 MHz.)

The aerial is of helical form to be flexible and is covered by neoprene for protection from the water.

The container 47 for the water-activated cell includes two removable closures. These closures are connected by nylon cords 48 to a T-shaped member 38 formed integrally with rupturable closure means (a cap 5) which closes the casing 1. The cords 48 are tensioned during operation of the marker to remove the closures.

A similar arrangement is employed for forming an opening in containers 41 for water-activated cells connected to bulbs 40. Nylon cords 44 are connected to the T-shaped member 38 and to removable closures 43 in the containers 41.

The smoke-generating composition 2 is ignited by means of a pair of uncocked striker mechanisms 19 and percussion caps (only one of each being shown). The igniting mechanisms 19 are each connected by means of nylon cords 28 to a retaining pin 28*a* in the cap 5.

The composition is arranged to burn for at least 15 minutes in use.

The cords 28 pass through a slit in the shape of a cross in valve means consisting of a plastics membrane 27, which covers the open end of the neck of the casing 1. The cords 28 can thus be withdrawn through the membrane 27 without damaging it, and it thereafter regains its normal flat shape thus restricting the ingress of water through the outlet.

The casing comprises two cylindrical parts 3, 4 of aluminium in screw-threaded engagement with each other. The upper end of the casing houses a smoke baffle which includes a baffle disc 21.

The igniting mechanisms 19 are operated by tensioning the cords 28. When the tension reaches a certain value, the igniting mechanisms operate and the cords 28 are released.

The cap 5 has a circumferentially-extending line of weakness 39 to facilitate rupture of the cap.

Certain aspects of the marker are described in more detail in United Kingdom patent specification No. 1,277,573.

Normally, when the marker is stored on a ship, it will be connected to a mounting secured to the ship which includes two loops arranged in vertical planes. The marker, which will normally be vertical as shown in the drawings, will be so positioned that one loop surrounds each of the outwardly-extending arms 49 of the TP-shaped member 38. The marker can therefore pivot about the arms 49.

In operation, when it is desired to operate the marker, it can be grasped at the lower end (as seen in the drawing) and pivoted about the arms 49. The mounting will be such that the cap 5 quickly meets a stop. Then continued pivoting of the device in the same direction will rupture the cap around the groove 39, and expose the smoke outlet. The part of the cap 5 above the groove 39 will remain secured to the mounting, and the marker will now be secured to the mounting (via the cap 5) by means only of the cords 28, 44 and 48. Further movement of the marker from the mounting will tension the cords. When the cords are tensioned sufficiently, the igniting mechanisms 19 will operate and the cords 28 will consequently undergo release, the closures will be removed from the containers 41 and 47 and the cords 44 and 48, respectively, will in consequence undergo release. The marker will now be set free and can be thrown overboard. The ignition of the marker will already have begun, and the transmitters 45 and lights 40 will operate as soon as the device reaches the water (as the containers of the respective water-activated cells flood and the cells are activated). The device will thus act as a marine marker.

In practice, the movement of the device to free it from its mounting can be carried out quickly with a single manual movement. If desired, it may be moved automatically in response to the release of a life-belt.

The position of the marker may be determined by visual observation of the smoke, and by the use of suitable direction-sensitive receiving equipment provided on the ship.

Figure 4:
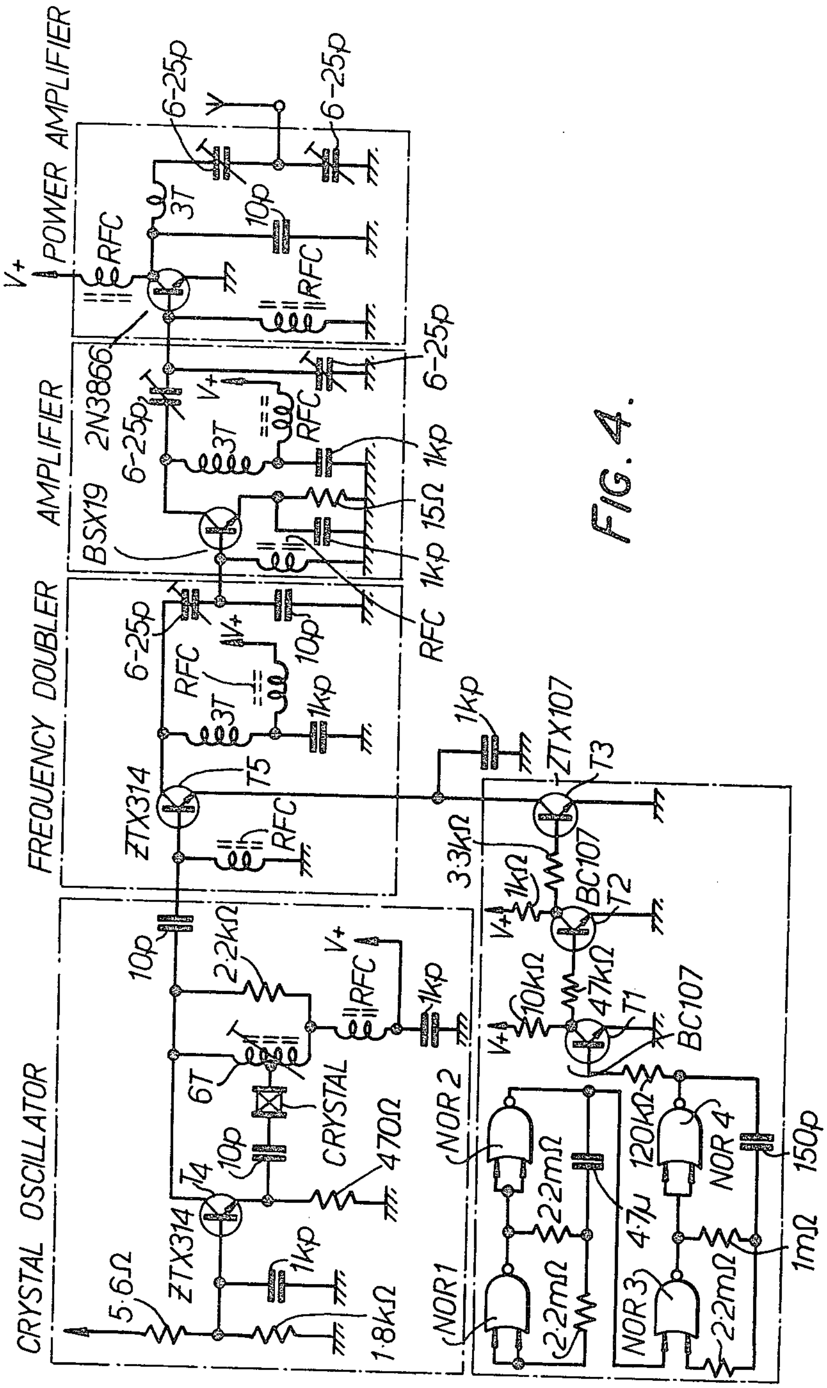
FIG. 4 shows a suitable circuit for the transmitter of the marker.

FIG. 4 shows an example of a suitable circuit for the transmitter. The transmitter comprises a crystal oscillator which feeds a frequency doubler stage. The frequency doubler stage is class D modulated by the output of a timing generator. The resulting signal is fed to an amplifier and a power amplifier. The output is in the region of 50 to 500 milliwatts at a frequency in the V.H.F. band. The type of modulation can be varied to suit any international requirements for distress beacons.

The modulator includes two pairs of NOR gates, NOR 1 to 4, which are complementary metal oxide silicon (integrated) transistor circuits. Gates NOR 3 and NOR 4 provide a signal of rectangular wave-form and audible frequency and are controlled by gates NOR 1 and NOR 2 in such a way that the signal only appears in periodic bursts. The bursts are of 5 second duration and are spaced by intervals of 10 seconds. This signal is then fed into a two-stage amplifier with grounded emitter transistors ($T_1$ and $T_2$). Transistor $T_3$ tends to render the waveform rectangular (if it is not already rectangular before it reaches $T_3$) and is used to switch frequency doubler stage (which is a radio frequency amplifier) on and off in accordance with the waveform.

The oscillator is controlled by a quartz crystal having a fundamental resonant frequency of 60.825 MHz. The oscillator employs positive feedback over a transistor $T_4$.

The frequency doubler stage selects the tips of the radio frequency signal from the oscillator and amplifies them in a class C mode; the frequency doubler stage includes a tuned circuit tuned (by means of a pre-set variable capacitor) to a frequency equal to twice the fundamental resonant frequency of the crystal. Transistor $T_5$ is switched on and off by the modulator to effect the modulation of the V.H.F. carrier wave.

The audio frequency modulated radio frequency signal is the fed, via a tuned amplifier and a tuned power amplifier, to the aerial.

Impedence matching between the circuit and the aerial is carried out by means of two adjustable capacitors (trimmers) in the power amplifier.

The modulator described will produce a constant audio frequency. However, it could be modified to produce a swept tone (for example, a sweep of 700 Hz in the 300 to 1600 Hz region).

The circuit is earthed by connection to the negative pole of the battery which is itself connected to the metal casing of the marker, which will in turn be earthed by the water.

Figure 10:
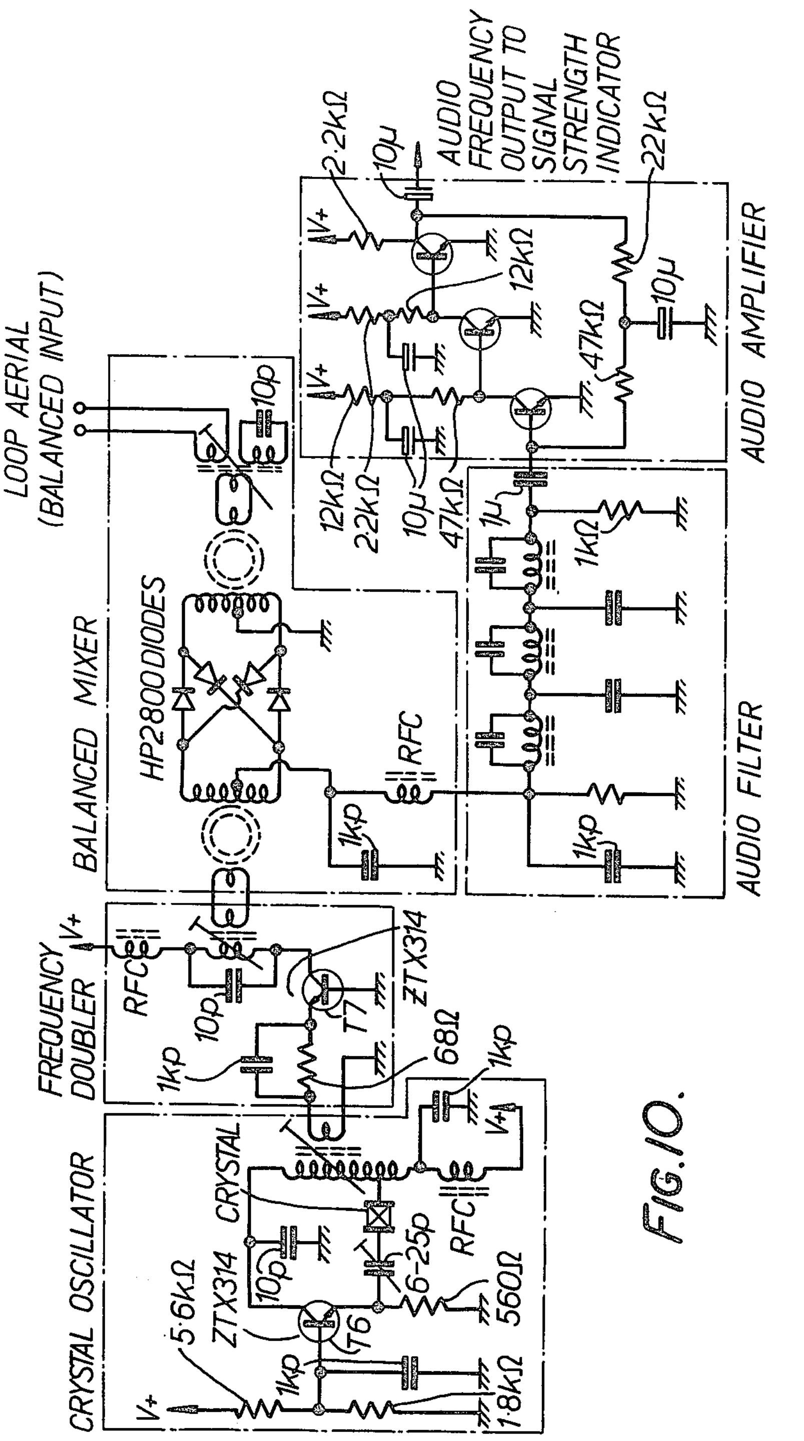
FIG. 10 shows a suitable circuit for the receiver.

FIG. 10 shows the circuit diagram of a receiver which is suitable for use with the transmitter whose circuit is shown in FIG. 4.

The receiver is a fixed tuned self-contained portable unit having a directionally-sensitive aerial. A balanced mixer mixes the incoming signal from the aerial with locally produced radio frequency oscillations of substantially the same frequency as that of the carrier wave of the transmitter to produce an audio beat note. The resulting signal is filtered, amplified and fed to a signal strength indicator to enable the direction of the transmitter to be ascertained.

The oscillator of the receiver is basically the same as that of the transmitter, and incorporates a quartz crystal and employs positive feedback over a transistor $T_6$. The radio frequency oscillations with which the signal from the aerial is mixed (twice the fundamental resonant frequency of the crystal) are arranged to differ in frequency from that of the transmitter carrier wave by 1KHz. This is to ensure that the frequencies of the oscillations, even if drift takes place, are not identical, in which case the output could be zero (if the carrier wave oscillations and the local oscillations were in phase). The audio output has a frequency equal to the difference between the frequency of the receiver oscillations and the carrier wave frequency (that is, the audio beat frequency) mixed with it.

The frequency doubler stage is similar to that of the transmitter in that it selects the tips of the radio frequency signal from the oscillator and amplifies them in a class C mode, and in that it includes a tuned circuit tuned (by means in this case of a preset variable inductor) to a frequency equal to twice the fundamental resonant frequency of the crystal. Transistor $T_7$ has a grounded base and isolates the output resonant circuit from the crystal oscillator resonant circuit.

The balanced mixer employs four diodes to synchronously detect the incoming signal and demodulate it to produce an audio output corresponding to the modulations produced by the transmitter's modulator. The inductors have toroidal cores.

The audio filter is a low pass filter which prevents V.H.F. modulation products from being transferred to the amplifier and only passes an audio band of frequencies.

The amplifier, which is a three-stage directly coupled amplifier with negative feedback, produces an output of sufficient strength to drive the signal strength indicator, which may be a moving coil meter, a visual display indicator or means for producing a frequency modulation of an audio tone. The latter may be a voltage controlled oscillator, and arranged to produce a frequency modulation of an audio tone in accordance with the amplitude of the signal received. The audio tone is locally generated and distinct from any produced by the transmitter. In this case, the direction can be sensed by turning the receiver until, for example, the lowest note is heard. A monitor loudspeaker may also be incorporated.

The aerial may be a loop aerial designed to produce a sharp null in its radiation pattern which is used to enable the operator to decide the direction of radiation from the transmitter by looking for a minimum in the signal. Sensing facilities are provided to overcome the 180° ambiguity experienced with this method of direction finding. This may be a dipole aerial which can be switched in, and it can be observed whether an increase or decrease in signal strength takes place when it is switched in. As an alternative, a corner reflector may be used as aerial which would eliminate the 180° ambiguity.

The circuits of the transmitter and receiver may be formed as thick film circuits.

The receiver is a portable unit so that it can be taken into a boat in the process of searching for a person in the sea whose position is marked with a marker according to the invention.

FIGS. 5 to 9 show smoke markers, or parts thereof, which differ from that of FIGS. 1 to 3 in that different forms of aerial are provided. The aerials are all arranged to radiate equally in azimuth. It is an advantage that the radiation is preferentially directed parallel to the sea surface. This may be achieved with the dipole aerials by making them slightly longer than a quarter wavelength.

Figure 5:
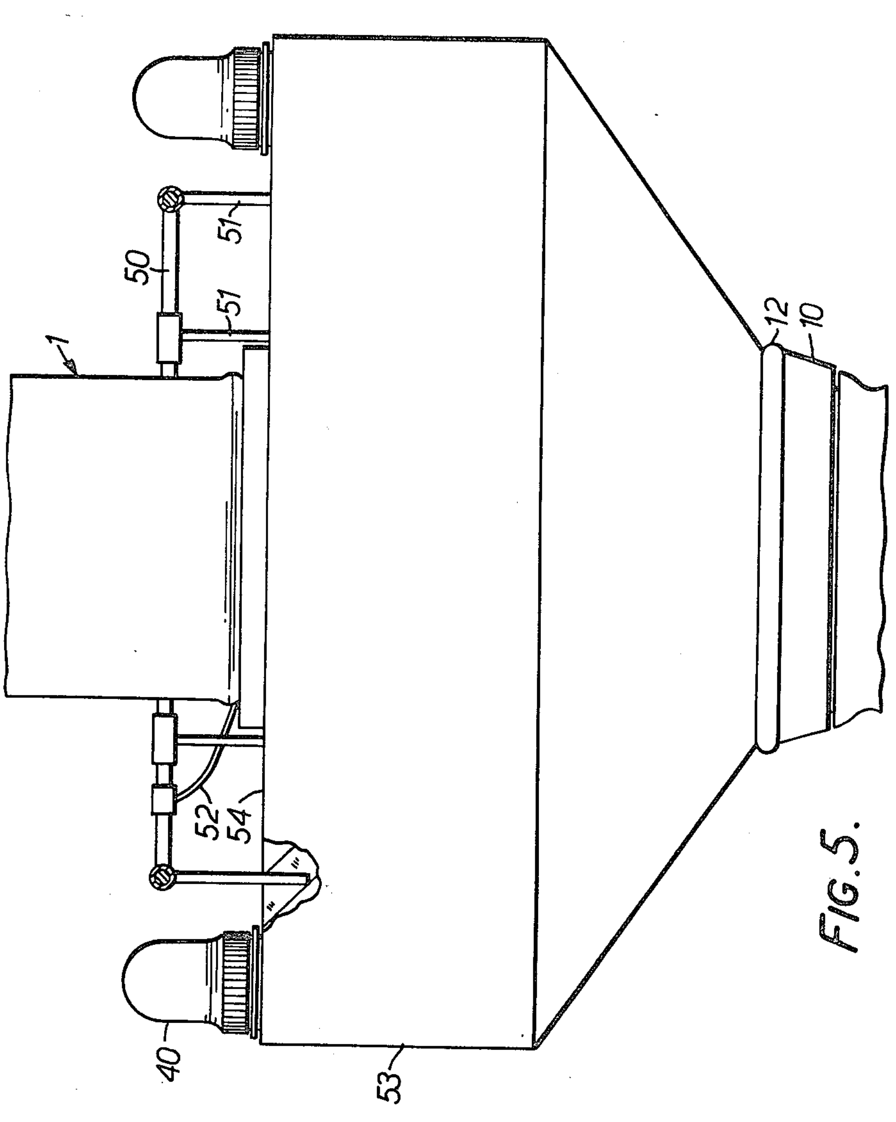
FIGS. 5, 6, 8 and 9 show other forms of marker according to the invention.

FIG. 5 shows a part of a smoke marker which differs from that shown in FIGS. 1 to 3 in that a different form of aerial is provided and in that the float is a different shape.

FIG. 5 shows a horizontal circular closed loop aerial 50 arranged co-axially with the casing 1. It is supported by a number of insulating supports 51 at various points around its circumference. Coaxial lead 52 from the transmitter is connected to it, the sheath and core being connected at points spaced apart. The buoyancy float 53 differs from that (7) shown in FIGS. 1 to 3 in that it is oval, (the section of the drawing being taken through the major axis), to allow the bulbs 40 to be arranged outside the loop 50. A conducting screen 54 is provided on the upper surface of the float 53. It is connected to the metal casing 1 so as to be earthed. The aerial may be of any conductive material, for example, copper, brass, or stainless steel. The length of the circumference of the loop is approximately equal to a quarter of the wavelength of the carrier wave.

The marker of FIG. 5 is mounted and operated in the same way as that described in FIGS. 1 to 3. Among the advantages of the marker of FIG. 5 are that the aerial is ready for use and that therefore no additional means has to be provided to bring it into an operative state, and that the aerial occupies little space and is robust.

The smoke markers shown in FIGS. 6 to 9 have dipole aerials.

Figure 6:
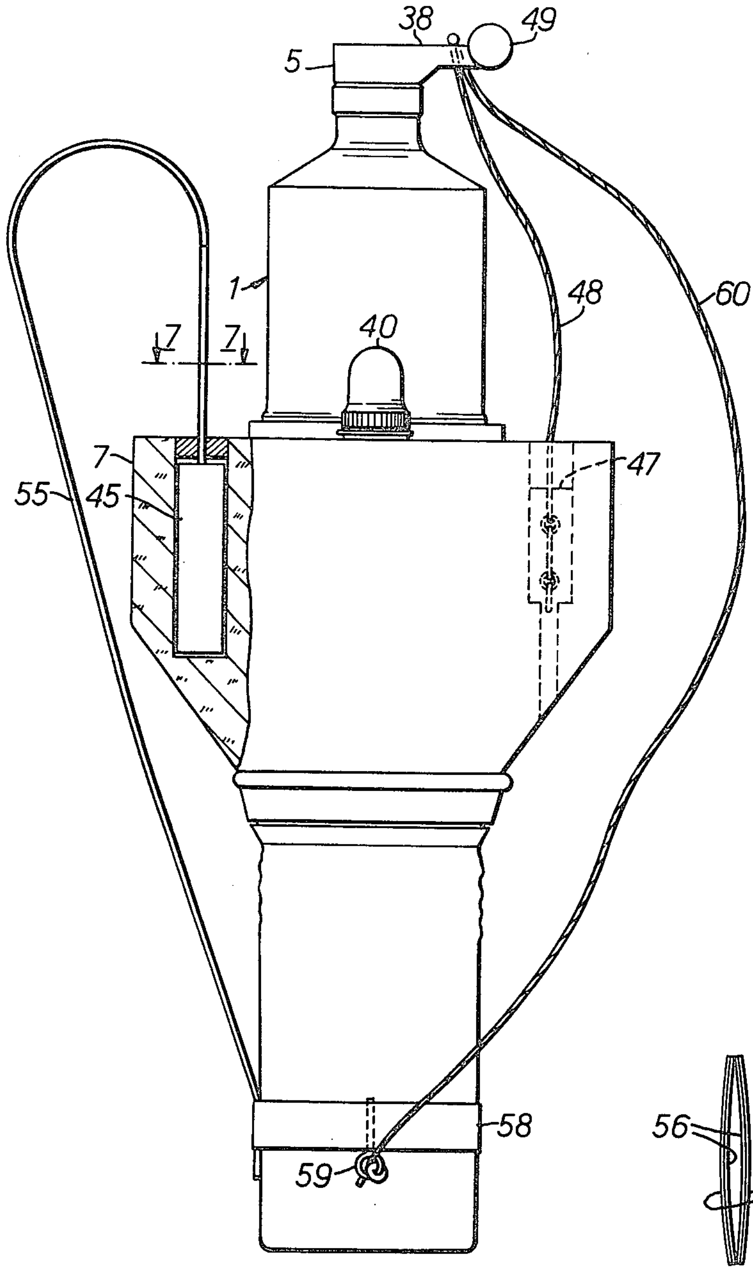
Figure 7:
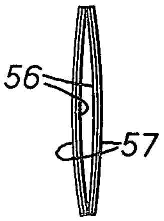
FIG. 7 is a section taken on the line 7—7 of FIG. 6 but is on a larger scale than FIG. 6.

The smoke marker shown in FIGS. 6 and 7 is identical to that shown in FIGS. 1 to 3 except that a different form of aerial is employed, and there is provided means for allowing it to erect in operation.

The aerial 55 consists of a pair of strips of steel 56 whose length is approximately equal to, but a little longer than, the wavelength of the carrier wave. The strips are curved in a transverse direction and arranged with the concave faces facing each other. Such an aerial tends to spring straight if deflected to either side of the straight position. A further short pair of strips 57 in contact with the strips 56 is provided at the base of the strips 56 to give the aerial additional stability against forces deflecting the aerial to one side or the other of the straight position.

The aerial 55 is so positioned that, when the marker is floating, the aerial is vertical in its unstressed state. To reduce the size that the aerial occupies on its mounting, however, the aerial is constrained into a loop, the end of the aerial remote from that adjacent to the upper surface of the float being held against the lower end of the casing 1 (as seen in the drawing) by means of a rupturable strap 58. A pin 59 is secured to the strap 58 and, by means of a length of cord 60, to the cap 5 of the casing 1.

The strips 56, 57 are clamped together at the base and are secured to the transmitter. The transmitter in turn is secured to the float 7. In order to prevent the strips from separating from each other, a pin (not shown) passes through the strips at a point spaced apart from the base. The pin is rigidly secured to one of the outer strips and passes through longitudinal slots formed in the other strip(s), a head provided on the pin of greater diameter than the slots preventing the strips moving apart while allowing longitudinal movement to take place. (Relative longitudinal movement between the strips will take place when the aerial springs straight).

The marker is mounted and operated in the same way as is the marker described in FIGS. 1 to 3. In this case, however, movement of the marker away from the mounting when the cap 5 has ruptured also results in the pin 59 tearing strip 58 and releasing the aerial 55 to allow it to spring erect.

Figure 8:
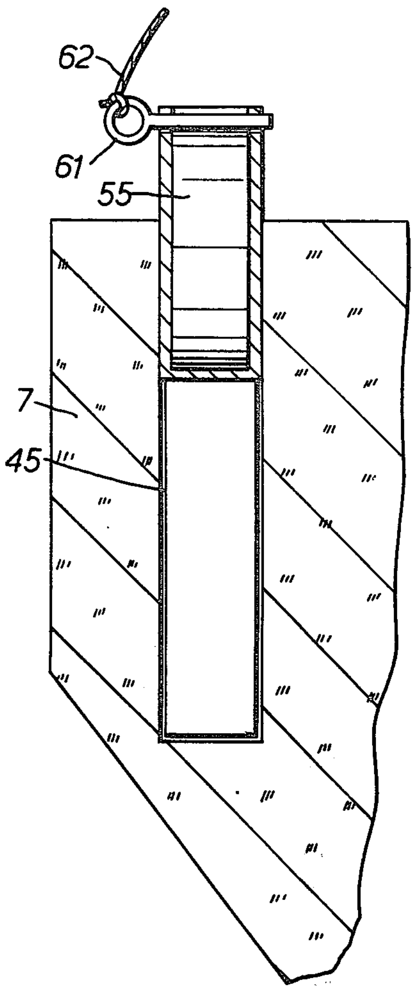

The smoke marker, a part of which is shown in FIG. 8, is identical to that shown in FIGS. 6 and 7 with the exception that the aerial is stored and released in a different way. The aerial 55, while being identical to that described in FIGS. 6 and 7, is stored in the form of a spiral. The aerial is constrained in this form by means of a retaining pin 61 which is connected, by means of cord 62, to the cap 5 of the casing 1.

The marker is mounted and operated in the same way as that described with reference to FIGS. 6 and 7. In this case, however, movement of the marker from the mounting causes the retaining pin 61 to be removed, so that the aerial 55 uncoils.

The marker shown in FIG. 8 occupies the smaller space in storage, while that shown in FIGS. 6 and 7 is easier to assemble.

Figure 9:
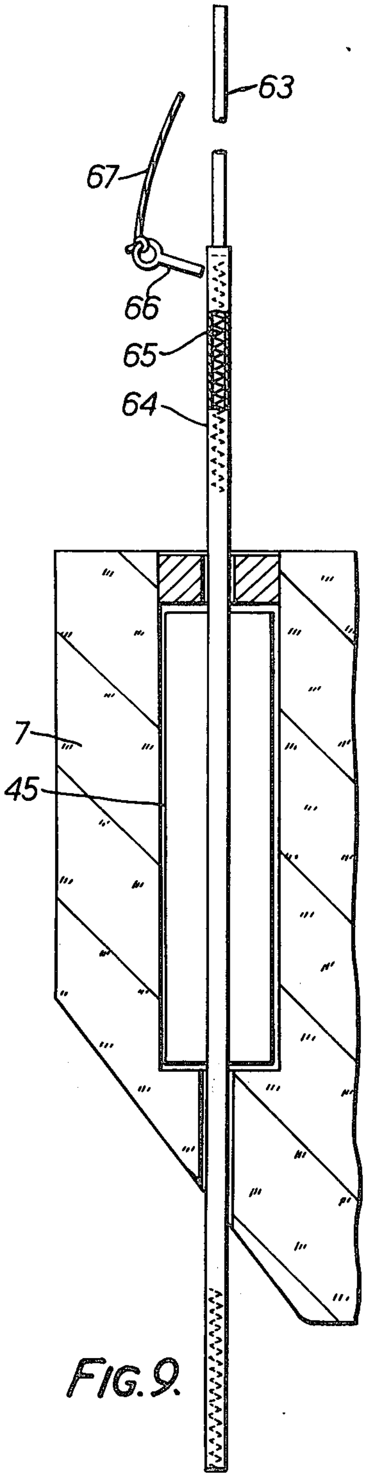

The smoke marker, a part of which is shown in FIG. 9, is identical to that shown in FIGS. 6 and 7, except that a different form of aerial is employed, with different means for bringing it into operation.

The aerial 63 of the marker of FIG. 9 is a helical conductor covered with a sleeve of a plastics material (for example, neoprene). During normal storage of the marker, the aerial 63 is held in a storage tube 64 against the force of a helical spring 65 by means of a retaining pin 66. The pin 66 is connected by means of a cord 67 to the cap 5 of the casing. A lead connecting to the transmitter is also contained in the storage tube 64.

The length of the helical conductor, if straightened out, would be approximately a quarter of the wavelength of the carrier wave.

The smoke marker of FIG. 9 is mounted and operated in the same way as that described for the marker of FIGS. 6 and 7. When the marker is removed from the mounting, the retaining pin 66 is removed, and the aerial 63 is raised in the storage tube by means of the spring 65. The aerial is vertical when the device is floating and the upper end is above the cap 5 of the marker, so reducing the effect on the radiation pattern of the metal cap 5. (If the aerial was not raised, but was simply secured at its base to the float, the top of it would be below the cap 5.)

The aerial of this marker also occupies a relatively small space during storage.

We claim:

1. Personnel marine smoke marker for marine use comprising an elongate casing, a mass of smoke-generating composition contained in said casing, igniting means for igniting said smoke-generating composition, a buoyance flotation ring, said flotation ring surrounding said casing over a part only of the length of said casing, a radio transmitter, said transmitter being recessed into said flotation ring, whereby the range of detection is increased while the marker is kept compact, an aerial, a power source for said transmitter, and circuitry connecting said power source and said aerial to said transmitter, the transmitter and the smoke-generating composition being operable concurrently for a period of time after the marker enters a body of water.

2. Smoke marker according to claim 1, including a mounting extension to mount said marker to said ship, a weakened portion intermediate said mounting extension and body of said marker to permit said marker to be freed from said ship, pull-cord connecting means to provide a releasable connection between said power source and said mounting extension to render said power source operative after said weakened portion has broken on throwing said marker overboard.

3. Smoke marker according to claim 2, wherein said power source is a water-activated cell, said cell having a water-tight container and a removable closure therefor, said pull-cord connecting means being secured to said removable closure.

4. Smoke marker according to claim 1, including a mounting extension to mount said marker to said ship, a weakened portion intermediate said mounting extension and body of said marker to permit said marker to be freed from said ship pull-cord connecting means to provide a releasable connection between said aerial and said mounting extension to raise said aerial after said weakened portion has broken on throwing said marker overboard.

5. Smoke marker according to claim 4, said aerial being an extendible aerial.

6. Smoke marker according to claim 4, said aerial including a strip of resilient steel curved in a transverse direction to give said strip longitudinal stability, a rupturable strap releasably securing said strip against said casing in a loop, said pull-cord connecting means being connected to said rupturable strap.

7. Smoke marker according to claim 6, said aerial including a further strip of resilient steel curved in a transverse direction, the curvatures of said strips being opposed.

8. Smoke marker according to claim 4, said aerial including a strip of resilient steel curved in a transverse direction to give said strip longitudinal stability, said strip being wound in a coil, a releasable retaining pin to secure said strip in said coil, and said pull-cord connecting means being secured to said retaining pin.

9. Smoke marker according to claim 8, said aerial including a further strip of resilient steel curved in a transverse direction, the curvatures of said strips being opposed.

10. Smoke marker according to claim 4, including a storage tube for said aerial, said aerial being of helical form, a spring to urge said aerial into a raised position, releasable retaining means to retain said aerial in a retracted position in said tube, said pull-cord connecting means being secured to said releasable retaining means.

11. Smoke marker according to claim 1, said aerial being a loop aerial orientated to be in a substantially horizontal plane when said marker is floating.

12. Smoke marker according to claim 11, including a screen of conducting material beneath said loop, said screen being located to be in a substantially horizontal plane when said marker is floating.

13. Smoke marker according to claim 12, said loop being co-axial with said elongate casing.

14. Smoke marker according to claim 1, wherein said transmitter operates in the V.H.F. region, and includes a quartz crystal oscillator wherefrom a carrier wave is derived, a pair of logic gates wherefrom a rectangular wave-form audio signal is produced, a radio frequency amplifier stage to be switched on and off by said audio signal to thereby modulate said carrier wave with said audio signal.

15. Smoke marker according to claim 14, wherein said amplifier stage is operative to act as a frequency doubler for said carrier wave.

16. Smoke marker according to claim 15, wherein said transmitter is a thick film circuit, said circuit being encapsulated in synthetic resin.

17. Smoke marker according to claim 1, wherein said power source is recessed into said flotation ring at a position diametrically opposed to that of said transmitter.

18. Smoke marker according to claim 17, wherein said float is foam filled and plastic covered.

19. Rescue equipment for marine use consisting of: a personnel marine smoke marker comprising an elongate casing, a mass of smoke-generating composition contained in said casing, igniting means for igniting said smoke-generating composition, a buoyancy flotation ring, said flotation ring surrounding said casing over a part only of the length of said casing, a radio transmitter, said transmitter being recessed into said flotation ring, whereby the range of detection is increased while the marker is kept compact, an aerial, a power source for said transmitter, the transmitter and the smoke-generating composition being operable concurrently for a period of time after the marker enters the water; and a directionally-sensitive receiver therefor, said receiver having an oscillator and being a heterodyne receiver such that the beat frequency is in the audible band.

20. Rescue equipment according to claim 19, the receiver including a diode network for synchronously detecting the signal from the receiver aerial.

* * * * *